United States Patent [19]
Kipping

[11] 4,335,680
[45] Jun. 22, 1982

[54] SYSTEM FOR METHOD FOR PRODUCTION OF MARINE FOOD USING SUBMERGED PLATFORMS

[76] Inventor: Vernon L. Kipping, 540 Melrose Ave., San Francisco, Calif. 94127

[21] Appl. No.: 168,049

[22] Filed: Jul. 14, 1980

Related U.S. Application Data

[63] Continuation-in-part of Ser. No. 968,128, Dec. 11, 1978, abandoned, which is a continuation-in-part of Ser. No. 781,697, Mar. 28, 1977, Pat. No. 4,137,869.

[51] Int. Cl.³ .............................................. A01K 61/00
[52] U.S. Cl. .......................................... 119/3; 119/4
[58] Field of Search .................................. 119/3, 2, 4

[56] References Cited

U.S. PATENT DOCUMENTS

| | | | |
|---|---|---|---|
| 2,283,472 | 5/1942 | Tuxhorn | 119/3 |
| 3,294,061 | 12/1966 | Hanks | 119/4 |
| 3,741,159 | 6/1973 | Halaunbrenner | 119/4 |
| 4,137,869 | 2/1979 | Kipping | 119/3 |

FOREIGN PATENT DOCUMENTS 2127380 10/1972 France ................................ 119/4

Primary Examiner—Hugh R. Chamblee
Attorney, Agent, or Firm—Julian Caplan

[57] ABSTRACT

An improvement over the prior invention, U.S. Ser. No. 781,697, filed Mar. 28, 1977, now U.S. Pat. No. 4,137,869 wherein was disclosed a platform maintained below the surface waters which are not naturally suitable for production of marine food. Means is provided to supply nutrients to the platform at a controlled rate. The platform is located at such depth that solar or other illumination causes the nutrients to reinforce the natural eco-system, thereby increasing the production of fish which may be harvested as food. A feature of the improvement is that the platform is formed of modular segments which may be independently added or removed as a means for controlling available habitat or for servicing the platform. Further improvements in the controls for nutrients and for maintaining buoyancy are disclosed. Also clusters of tubes having buoyancy means may be secured to the platform to augment production, or may be independently secured at a distance from the platform.

12 Claims, 11 Drawing Figures

SYSTEM FOR METHOD FOR PRODUCTION OF MARINE FOOD USING SUBMERGED PLATFORMS

This application is a continuation-in-part of Application Ser. No. 968,128 filed Dec. 11, 1978, now abandoned, which was a continuation-in-part of Application Ser. No. 781,697, filed Mar. 28, 1977, now U.S. Pat. No. 4,137,869.

This invention relates to a new and improved system and method for production of marine food using submerged platforms. Reference is made to U.S. Pat. No. 4,139,869 of which this application is an improvement. In the aforesaid patent, numerous advantages of the system and method therein disclosed are set forth. The present invention involves many, if not all, of the advantages of the prior invention and hence these advantages are not repeated herein.

A particular feature of the present improvement is that the platform which is supported at a particular depth may be modular, the individual segments being capable of being independently added or removed as a means of controlling available habitat or for servicing the platform.

In one form of the invention herein disclosed, simple open-bottom flotation or buoyancy tubes are employed to simplify the structure of the buoyancy means. Surface turbulence may rupture the seal of this type buoyancy tube when the platform is raised to the surface or towed on the surface. Accordingly, in a preferred embodiment, open-bottom buoyancy chambers are provided with downwardly extending tubes attached to apertures or openings on the underside of the buoyancy chambers. The tubes insure that the water intake openings always remain underwater, thereby retaining the integrity of the buoyancy chambers even in the event of consisiderable surface turbulence.

Preferably each platform is sufficiently large in size so as to be self-supporting and productive and may consist of smaller, independently supported segments, which can be removed or added to the whole to facilitate repairs, modifications and maintenance.

Hollow structures such as tubes may contain integral buoyancy chambers or other buoyancy means to enable the tubes to acquire buoyancy independent of the base of the platform. Clusters of such hollow structures may be tethered to the platform base without adding to the weight loading of the platform. These provide a new means for providing additional habitat for marine life. As a modification, hollow structures may be clustered around and secured to buoyancy means independent of the platform thereby providing a simple, economical means of increasing cover and habitat.

An advantage of this system is that the ocean currents may be effectively utilized as a nutrient distribution means. Nutrient is expelled from the nutrient storage tanks by means of metered air pressure for controlled periods of time.

Nutrient is inserted into ocean currents moving past the anchored platform units. The effect is to greatly expand the effective production area of the marine food system without the necessity of additional investment of money or materials for additional platforms. In lieu of platforms, clusters of hollow tubes or structures provided with integral buoyancy, tether and anchor means, may readily be positioned at a variety of depths in the ocean region throughout the production area to provide habitat and substrate in an economical and compact form.

Other objects of the present invention will become apparent upon reading the following specification and referring to the accompanying drawings in which similar characters of reference represent corresponding parts in each of the several views.

Figure 1:
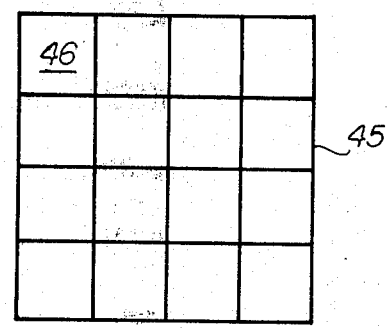
FIG. 1 is a schematic view of a composite platform made up of a plurality of modules.
Figure 2:
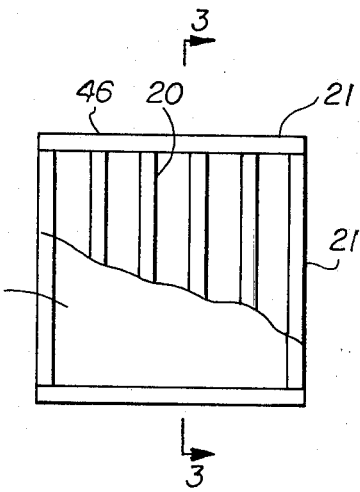
FIG. 2 is an enlarged schematic view of one of the platforms with parts omitted for clarity.
Figure 10:
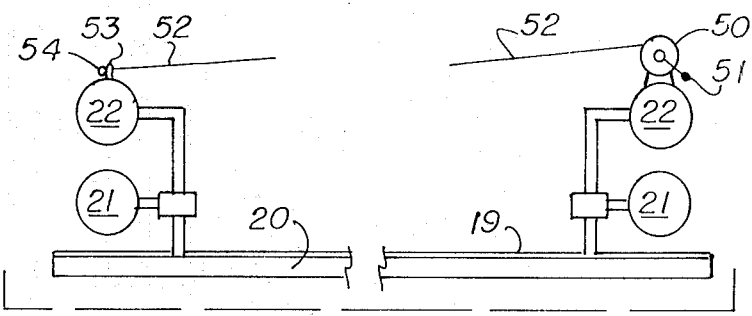
FIG. 10 is a schematic view showing one means for drawing and serving modules of a composite platform.

It will be observed that many of the structural features of the present application repeat or modify features of prior U.S. Pat. No. 4,137,869. Reference is made to the prior patent for some of the details of construction and operation. Platform unit 45, illustrated in FIG. 1, is made up of a plurality of modular, independently controllable segments 46. These segments may be attached to one another. One preferred means for drawing modules together and securing them is illustrated in FIG. 10. A windlass 50 on which cable 52 is wound, as by handle 51 is mounted on tube 22 or other convenient location on a segment 46. A securing bracket 53 mounted on tube 22 of another module provides attachment means for the end of cable 52 opposite windlass 50. A connector 54 on the end of cable 52 couples with attachment means 53. This arrangement permits modular platform segments to be drawn together and secured. It is understood that the windlass 50 described herein is by way of example only and that many variations on this concept may be practiced. Each modular segment 46 consists of a flooring 19 supported by buoyancy tanks 21 around the perimeter. Extending transversely between two opposed tanks 21 are air reservoir tanks 20 which further function to support the floor 19. Such segment 46 is shown schematically in FIG. 2, but in greater detail in FIG. 3. Compressed air or other gas is stored in reservoir tanks 20. For simplicity, the compressed gas in tanks 20 are referred to herein as "air". Air from tank 20 passes through pipe 23 to an air pressure reducer 24, and thence to tank 21 through intake valve 25. The tank 20 is partially filled with water. To increase or decrease the depth of the platform unit 46, air may be dispelled from tank 21 through valve 27 and water drawn into the tank 21 via valve 26 or water may be expelled through valve 26 by increasing the air pressure in the tank 21.

In proximity to tank 21 is nutrient tank 22 which is also connected to air line 23. A valve 28 controls admission of air to tank 22; and when air is admitted, nutrient stored in tank 22 is expelled preferably in metered quantities into the surrounding waters in the vicinity of the platform via valve 29.

Figure 4:
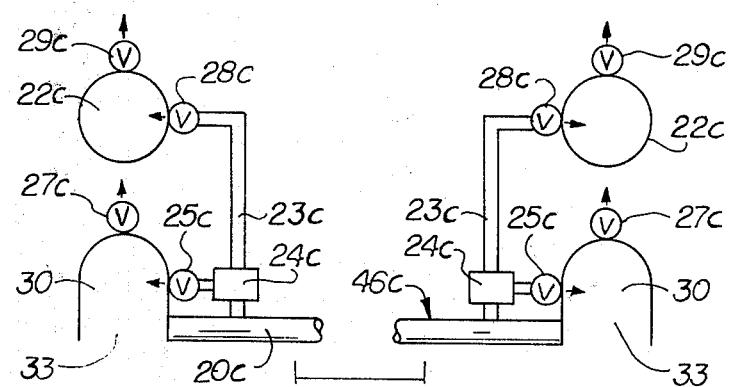
FIG. 4 is a view similar to FIG. 3 of a modified structure.

It will be observed that the structure heretofore described, aside from the modular feature disclosed, resembles that in U.S. Pat. No. 4,137,869. In FIG. 4, a modified structure is shown wherein buoyancy tanks 30 which substitute for or augment tanks 21 of the prior modification are used. Tanks 30 are open-bottomed. Air in reservoir tank 20c is fed via pipe 23c through air pressure reducer unit 24c into buoyancy tank 30 via intake valve 25c. Air is expelled from buoyancy tank 30 through valve 27c. Water is taken into tank 30 or expelled therefrom through the open bottom 33 of tank 30. Although tank 30 is illustrated in the structure of FIG. 4 it will be understood that a similar tank may be incorporated in the other structures herein illustrated and described. The nutrient tank is controlled in the same manner as in the preceding construction; and the same reference numerals followed by subscript c are used to designate corresponding parts.

Figure 5:
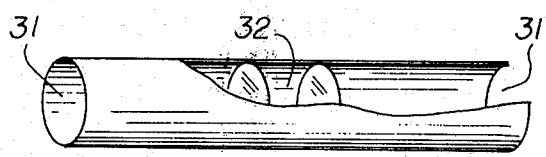
FIG. 5 is a perspective view of an alternate structure.

A further alternate construction is shown in FIG. 5 wherein a hollow structure 31 with open ends is provided having buoyancy means 32 centrally or otherwise located therein to provide buoyancy for the structure 31. The buoyancy means 32 may be a closed tank of air or a plastic material such as styrofoam or other materials substantially lighter than water. In any event tubes 31 float in the water. The structure 31 provides a habitat for flora and fauna which grow from the nutrient expelled from tanks 22 or 22c. The structures 31 may be connected to platform segment 46 in various ways such as tethering, lashing, welding or other desired means.

Figure 6:
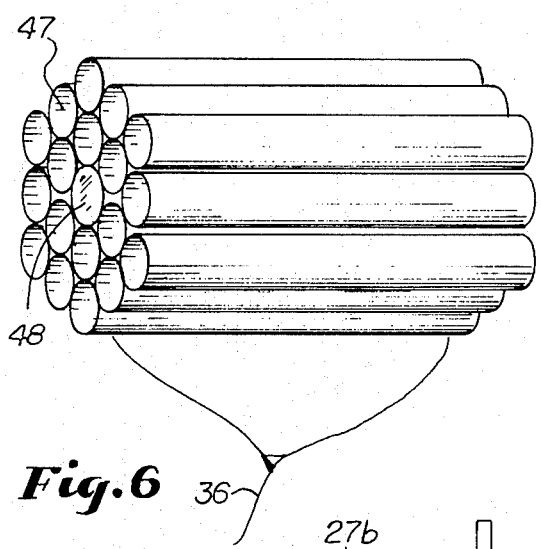
FIG. 6 is a perspective view of a further alternate structure.

A cluster of hollow structures 47 which are connected to a buoyancy support means 48 may be tethered to the platform by means of tether line 36, preferably at differing depths. This affords additional habitat for marine life without additional weight imposed on platform 45. In FIG. 6, some of the tubes 47 are open-ended and hollow, while one or more tubes 48 in the cluster may be buoyant, as by means similar to means 32 of FIG. 5. The hollow structures 47 support the growth of flora and fauna and are buoyed independently of the platform 46 by one or more buoyancy tanks 48.

Figure 7:
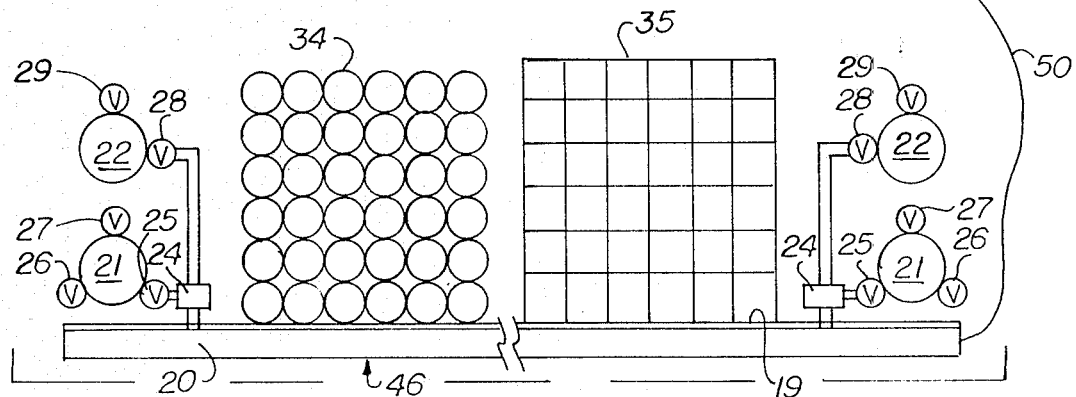
FIG. 7 is a view similar to FIG. 3 showing additional structure added.

Hollow structures 34, 35 may be clustered together by various means and supported on the platform 19. The structures 34, 35 are open at at least one end and provide habitat in regions where sufficient nutrients exist, but where there is a lack of natural substrate and habitat to support marine life. The members 34 and 35 are illustrated schematically, it being understood that instead of round and square structures, other forms may be used. The various structures 34, 35 are held together by various means. The hollow structures 34, as well as structures 31 and 47 of FIGS. 5 and 6 provide additional habitat to supplement platform 45. They may, if desired, have materials to support fauna, as well. In other respects, the structure shown in FIG. 7 is the same as that shown in FIG. 4, and the same reference numerals are used to designate corresponding parts.

Marker buoy 49 on the surface is secured to platform 46 by line 50. Buoy 49 marks the position of the platform so that it can be observed from the surface.

Figure 8:
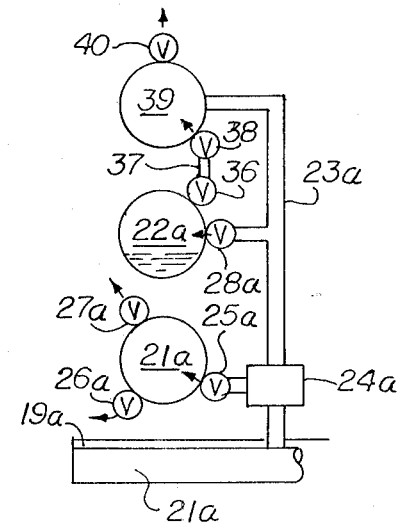
FIG. 8 is a view similar to a portion of FIG. 3 showing a further modification.

Directing attention to the structure shown in FIG. 8, a nutrient mixing tank 39 is provided in proximity to the nutrient storage tank 22a. Air from pipe 23a is admitted to the tank 22a through valve 28a causing nutrient concentrates stored in tank 22a to pass through valve 36 and conduit 37 into the mixing chamber 39 via valve 38. The nutrient concentrate is mixed in tank 39 with water until the desired nutrient level is achieved. Water is admitted through valve 40 and is also fed preferably in metered quantities into the surrounding ocean water through valve 40. Ingress and egress of water to tank 39 is controlled by the air in pipe 23a. Similar mixing may be incorporated in the other embodiments illustrated and described herein.

Figure 9:
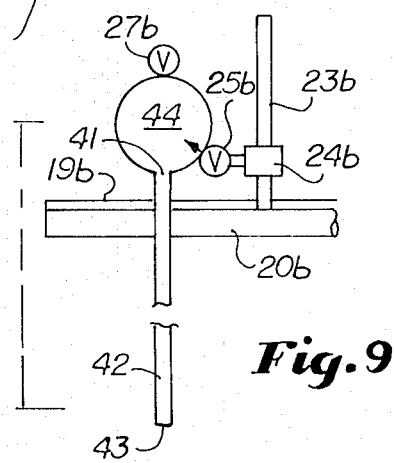
FIG. 9 is a view similar to a portion of FIG. 3 showing a still further modification.

FIG. 9 shows an improvement over the structure shown in FIG. 4. Buoyancy tank 44, which is the equivalent of tank 30 in FIG. 4 or tank 21 in FIG. 3, has depending vents for water intake or expulsion. This structure may be incorporated in the other embodiments of the invention. The tank 44 receives air from air reservoir 20 and water is expelled from tank 44 via aperture 41, vent tube 42 and water intake expulsion aperture 43 at the lower end of tube 42. Air is also exhausted from chamber 44 through valve 27b as a means of controlling the buoyancy capacity of tube 44. In other respects, the modification of FIG. 9 resembles that of the preceding modifications, and the same reference numerals followed by the subscript b are used to designate corresponding parts. It will be understood that in FIG. 9 the nutrient system is not illustrated, but this may resemble that of FIG. 3 or FIG. 8 or other means.

The tube 42 extends well below the surface. Hence when the platform is being towed or lifted to the surface, the tube 42 extends well below the surface so that the seals of the buoyancy tanks are not ruptured. The tubes 42 may be detachable or telescopic in construction so as not to interfere with navigation in shallow waters.

Figure 11:
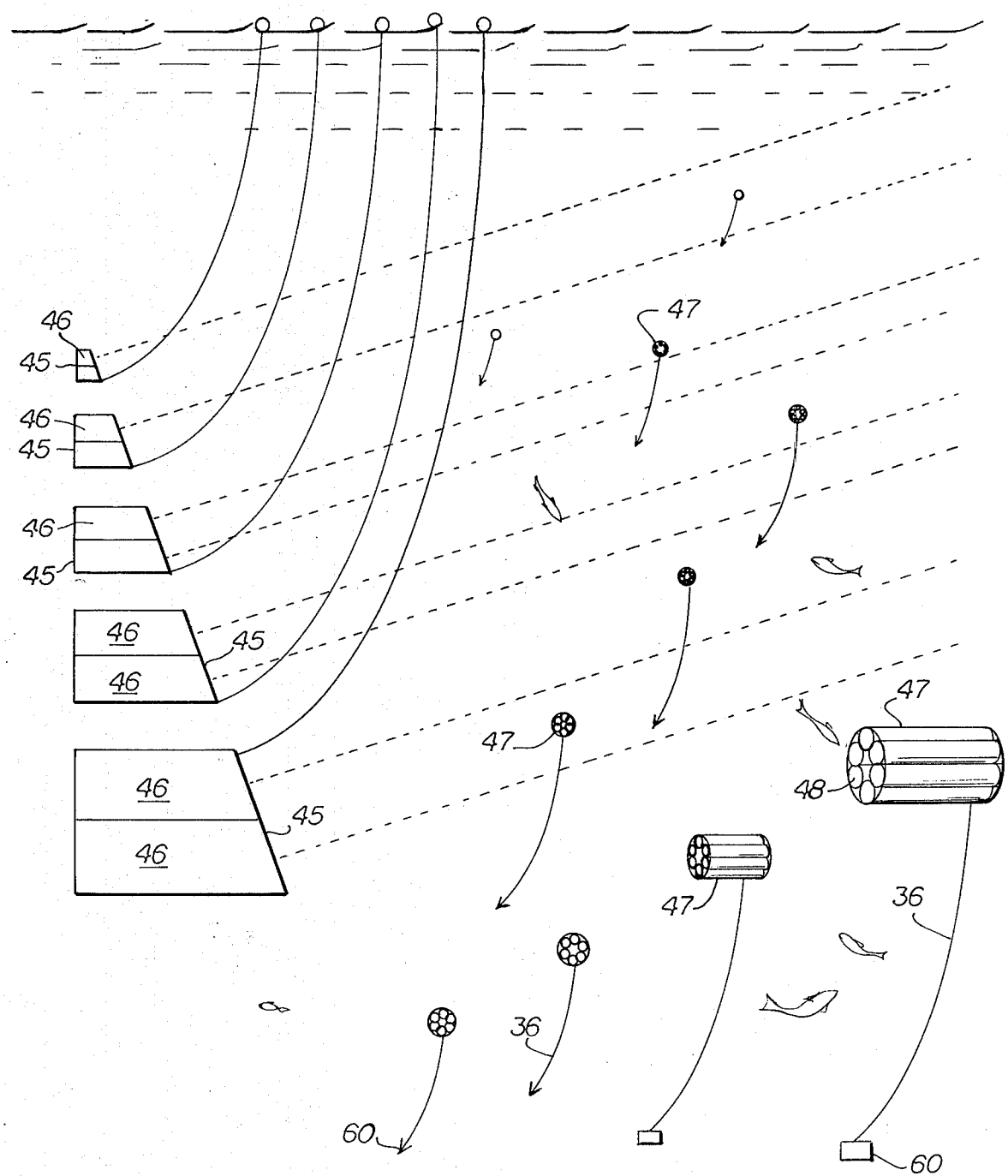
FIG. 11 is a schematic view in section of an ocean region in which the present invention is installed.

A particularly valuable feature of the present invention is the module design illustrated in FIG. 1. One modular element 46, comprising platform 45, may be combined in a variety of configurations to tailor the system to particular requirements. For example, a number of modular units 46 may be spaced apart and positioned along a base line of one mile at right angles to the prevailing ocean currents. (this is illustrated in FIG. 11) A solid base line of modular units 46 is not required, as the nutrient will spread laterally and vertically and will join with the nutrient release of other modular units 46.

Figure 3:
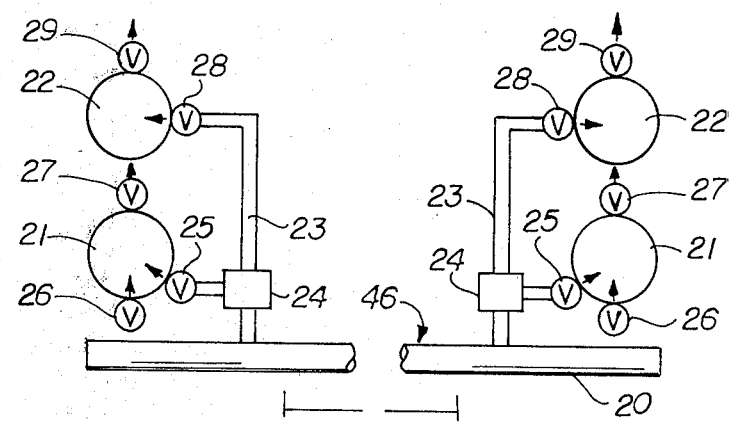
FIG. 3 is a sectional view of a portion of FIG. 2 taken substantially along the line 3—3 of FIG. 2.

Referring to FIG. 3, when nutrient is released by means of air from air reservoir tanks 20 via pipe 23 into air pressure reducer valve 24 and then to air valve 28 and nutrient storage tank 22, nutrient (not shown) is forced through valve 29 into the prevailing ocean currents moving past the anchored platform modules 46. The ocean currents then provide the distribution means of the nutrient, thereby greatly increasing the effective food production region in the ocean.

Assume an ocean current of 1.5 knots. If nutrient is released for six hours into such a current, a nutrient-enriched ocean region approximately one mile in width and ten miles in length will result. Depth of the nutrients may extend to 100 to 200 feet or more. In 24 hours, the nutrient region may extend to 40 miles beyond the platform base. In 36 hours, the range may reach 50 miles.

Phytoplankton reproduces at rates of three to six times daily on a geometric scale of production. A single liter of water may contain as few as 2,000 phytoplankton or as many as 200 Million. In 24 hours the nutrient-enriched ocean currents may extend approximately forty miles beyond the platform 46 release point and will be carrying and sustaining a vast phytoplankton bloom together with the marine food chain supported thereby. As this nutrient-enriched current moves along it continually undergoes dynamic change as phytoplankton is consumed by the marine food chain and as it reproduces itself.

Preferably scattered throughout the marine food production area are clusters of hollow tubes 47 shown in FIGS. 5 and 6. These clusters of hollow tubes 47 are provided with integral buoyancy means 48, tether line 36 which may be secured to an anchor or weight 60 or to the platform 45. The clusters of hollow tubes 47 are preferably positioned at varying depths throughout the entire ocean food production region. Tubes 47 are preferably of varying size to accommodate a variety of varying sizes of marine life.

Clusters of hollow tubes 47, when used as substrate and habitat provide a valuable adjunct to the marine food production system as represented by platform 45. Because the clusters of hollow tubes 47 are economical in cost and compact in form, they provide a highly flexible method of increasing habitat throughout the entire food production region associated with the platform 45. They are easily moved, installed or removed from the production region. They afford an effective extension of the platform 45 in that they provide habitat means to more effectively utilize the food productivity means created by the platform because of the nutrient and resulting phytoplankton bloom.

At some undetermined point in distance from the platform 46, the nutrient supply will diminish to a level where it can no longer support the existing phytoplankton population. At this point it may be economically feasible to install a second series of platform 46 units to provide additional nutrient in order to maintain and replenish the established phytoplankton population and thereby sustain the growth of the marine food chain which it supports.

What is claimed is:

1. A system for the production of marine food comprising an open platform, said platform comprising a flooring, buoyancy tanks around the perimeter of said flooring and including at least two substantially parallel, said buoyancy tanks and a plurality of air reservoir tanks extending transversely between said two opposed buoyancy tanks, said air reservoir tanks containing compressed gas, said buoyancy tanks being partially filled with water, first means located totally below the surface of the water for maintaining said platform submerged at a selected depth in an open body of water so that said platform is not subjected to wave action on the surface, means for supplying nutrients to said platform over an extended period of time, a buoyancy tank and a cluster of a plurality of cylinders having at least one open end connected to said platform to provide habitat for phytoplankton and habitat provided for marine life supported by phytoplankton and zooplankton is increased.

2. A system according to claim 1 which further comprises a plurality of hollow tubes on said platform to support flora and phytoplankton.

3. A system according to claim 1 which further comprises materials on said platform to support flora and fauna, said materials including soil, sand and other materials supporting vegetation.

4. A system according to claim 1 and which further comprises a plurality of said platforms and a plurality of cylinders having at least one open end connected to said platform to provide habitat for phytoplankton and habitat provided for marine life supported by phytoplankton and zooplankton is increased, and means for drawing and securing said modular platforms together to make up a large platform made up of said plurality of platforms.

5. A system according to claim 4 in which said system is located in the ocean where it is subjected to ocean currents and nutrient is dispersed from said means for supplying nutrients into said currents and spread over a large region to substantially increase marine production of flora and fish in said region; said cylinders being distributed over at least a substantial portion of said region, each said cylinder being provided with buoyancy means, an anchor and tether means interconnecting said anchor and said cylinders.

6. A system for production of marine food comprising an elongated cylindrical buoyancy tank having an air-tight chamber horizontally in the water, a plurality of elongated, open-ended horizontally disposed cylinders clustered around said buoyancy tank, locating means to secure said tank and cylinders at a predetermined depth, and nutrient supply means located in proximity to said buoyancy tank and approximately at said predetermined depth, said nutrient supply means comprising nutrient storage means and means for releasing nutrient from said storage means into the water over a prolonged time period.

7. A system according to claim 6 which further comprises a second elongated cylindrical buoyancy tank, a second plurality of elongated, open-ended cylinders clustered around said second buoyancy tank and second locating means to secure said second buoyancy tank at a predetermined depth, said buoyancy tanks being at different depths and both said tanks being in proximity to said nutrient supply means.

8. A system according to claim 6 in which said locating means is a tether attached to a submerged platform, to a continental shelf, to an underwater tower or to other anchor means.

9. A system for the production of marine food comprising an open platform, first means located totally below the surface of the water for maintaining said platform submerged at a selected depth in an open body of water so that said platform is not subjected to wave action on the surface, second means for supplying nutrients to said platform over an extended period of time, said first means comprising a reservoir tank of compressed gas and a buoyancy tank having communication means for communication of said buoyancy tank with water, said communication means extending down substantially below said platform so that gas does not escape from said buoyancy tank when said platform is in shallow water and valve means controlling admission of compressed gas from said reservoir tank to said buoyancy tank and ingress and egress of water in said buoyancy tank.

10. A system according to claim 9 in which said second means comprises a nutrient storage tank for concentrated nutrient and a nutrient mixing tank and valve means for forcing nutrient from said nutrient storage tank to said mixing tank by compressed gas, admitting water into said mixing tank and expelling diluted nutrient from said mixing tank.

11. A system according to claim 9 in which said communication means comprises depending vertical tubes communicating with said buoyancy tank extending to a sufficient depth so that buoyancy seal is not lost by wave action on said platform when near the surface of the water.

12. A system according to claim 9 which further comprises a plurality of said open platforms spaced apart in an ocean region where they are subjected to ocean currents, each said platform having first means and second means as defined in said claim 10, whereby nutrient released into said current is dispersed throughout said region to support production therein of phytoplankton and fish in said region.

* * * * *